(No Model.)
M. AMS.
APPARATUS FOR AND PROCESS OF OBTAINING OIL AND OTHER MATTER FROM OFFAL.
No. 304,687. Patented Sept. 9, 1884.
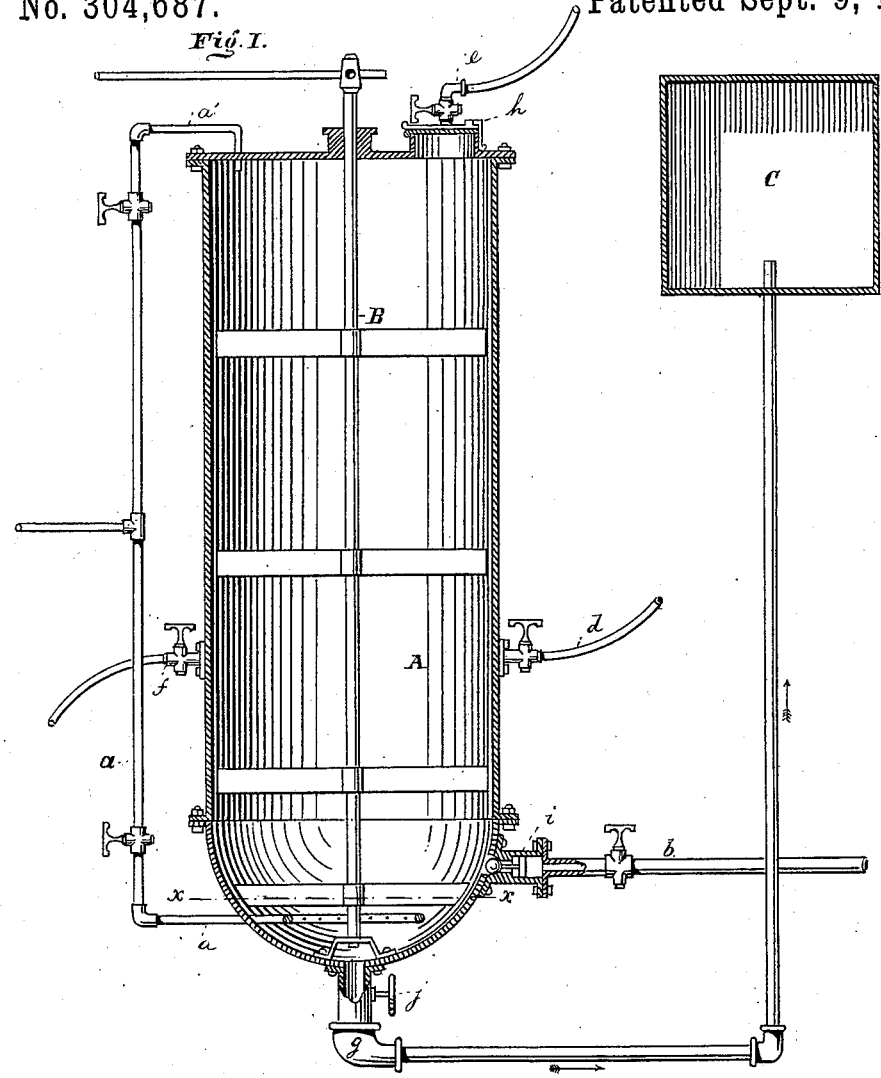
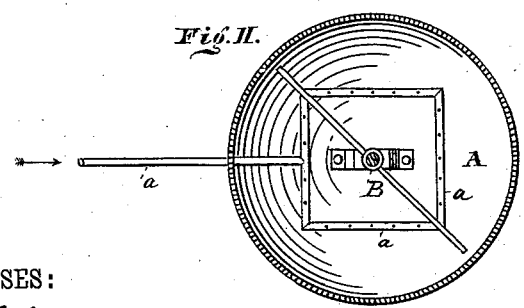
WITNESSES:
R. Huber
Robt H. Roy
INVENTOR
Max Ams
BY
Frank V. Briesen
ATTORNEY

UNITED STATES PATENT OFFICE.

MAX AMS, OF NEW YORK, N. Y.

APPARATUS FOR AND PROCESS OF OBTAINING OIL AND OTHER MATTER FROM OFFAL.

SPECIFICATION forming part of Letters Patent No. 304,687, dated September 9, 1884.

Application filed May 27, 1884. (No model.)

*To all whom it may concern:*

Be it known that I, MAX AMS, of the city of New York, in the county and State of New York, have invented an Improved Apparatus for and Process of Obtaining Oil and other Matter from Offal, of which the following specification is a full, clear, and exact description.

This invention relates to a new apparatus for and process of obtaining oil and other matter from offal, particularly fish-offal; and the invention has for its object to obtain such oil in a pure or nearly pure state, and in a short time.

The invention consists in the details of construction of the apparatus, and in the various stages of process, as hereinafter pointed out.

In the accompanying drawings, Figure I is a vertical central section of the improved apparatus for carrying out my process. Fig. II is a horizontal section on line $x\ x$, Fig. I.

The letter A represents a tank of cylindrical or other form, made steam and water tight. Within this tank is placed an agitator, B, consisting, preferably, of a vertical shaft carrying a number of radial blades and capable of being revolved by suitable gear-connection. The bottom of the tank I prefer to make semi-spherical, and the lowermost blade is made shorter than the others, so as to fit within the lower part of the tank.

$a$ is a steam-pipe communicating with the bottom of the tank, and preferably also by branch $a'$ with the top. Within the tank the pipe $a$ is bent into rectangular form, Fig. 2, and is provided with a number of perforations through which the steam may issue. This form of pipe I prefer as being least liable to be injured by the offal when thrown thereon.

$b$ is a pipe connecting with a water-supply pump, and entering near the bottom of tank A, where it may be provided with a check-valve, $i$, or cock, or both.

$d$ is a water-discharge pipe, arranged preferably slightly below the center of the tank.

$e$ is the oil-cock at the top of the tank, and $f$ a cock for drawing off nutritious matter.

$g$ is a blow-off pipe for receiving the residue or fertilizing-matter from bottom of tank A, and conveying it to vessel C, as will all be now more fully described.

All the cocks being closed, the tank A is first charged with fish-offal—such as heads, intestines, and other fatty matter—through an opening at the top. The opening is then closed by a cover, $h$, which is locked down steam-tight by a suitable locking-bar. Live steam is next admitted, under a pressure of about thirty pounds to the square inch, through pipe $a$, and the agitator B is revolved. The joint action of steam and agitator is kept up for from two to three hours, whereupon the steam is turned off, and water from pipe $b$ is turned on. This pipe being connected to a pump admits the water slowly to tank A under pressure, causing it to rise gradually therein. The check-valve $i$ will aid to prevent, during this operation, the escape of steam from tank A, and the steam will gradually condense as the water rises. During the admission of water the agitator B is kept in motion; and to this feature of the process I attach considerable importance, as I have found that the separation of oil is by far more thoroughly effected if the rising water acts simultaneously with the agitator. The combined action of the two properly completes the separation of the oil, and this will float upon the water and rise with it. As soon as the tank is filled—*i. e.*, as soon as the water and floating oil have risen to the top of the tank—the agitator B is stopped, and the oil-cock $e$ is opened. The water-supply being continued, the oil is forced out of cock $e$ and flows into a suitable receiving-vessel. When no more oil is discharged from cock $e$, the water-supply is discontinued, but cock $e$ is left open to admit air. During the foregoing operation the heavy residue of the offal will have settled on the bottom of the tank, and consequently when next the cock in discharge-pipe $d$ is opened only water will be discharged. This water may be allowed to go to waste. Next cock $e$ and cock in pipe $d$ are closed, and the tank being thus again steam-tight, steam is turned on through pipe $a$ or $a'$, to fill the tank with steam under pressure from about five to thirty pounds to the square inch. Then the steam is turned off, and a cock, $j$, in blow-off pipe $g$ is opened, and at the same time the agitator B is set in motion. The residue or fertilizing-matter is thus blown off out of tank A, through pipe g, with considerable force, and is deposited in a suitable receptacle, C. The action of the agitator B during this part of the process prevents clogging of the apparatus.

Under ordinary circumstances I employ the steam-pipe a for admitting the blowing-off steam; but if the tank is to be cleaned, I use the pipe a'.

During the foregoing process, after the water from pipe b has been admitted, and before the oil is drawn off from cock e, I may open a cock, f, situated somewhat below the center of the tank. Through this cock will now be discharged a nutritious matter that may be subsequently condensed and used the same as an extract or as glue. This matter is situated, while in the tank, between the oil on top and the residuum at the bottom, and may be drawn until oil begins to be discharged. The cock f is thereupon closed and the cock e opened, when the operation goes on as hereinabove described.

I do not claim to have invented the simultaneous admission of steam and water into a rendering-tank, such as described in Patent No. 256,715, granted to J. K. Martin, April 18, 1882; nor do I claim the combination of a rendering-tank with an agitator, as described in Patent No. 136,420, granted to P. W. Dalton, March 4, 1873; but I do claim—

1. The combination of tank A with agitator B, perforated steam-pipe a, water-pipe b, having cock or valve i, oil-cock e, discharge-pipe d, and blow-off pipe g, having cock j, substantially as specified.

2. The process of treating offal which consists in first subjecting it to the combined action of steam and an agitator, and then to the combined action of rising water and an agitator, substantially as specified.

3. The process of treating offal which consists in first subjecting it to the combined action of steam and an agitator, then shutting off the steam and subjecting the offal to rising water and an agitator, then stopping the agitator, and forcing the oil out by means of the rising water, substantially as specified.

4. The process of treating offal which consists of the following consecutive steps: subjecting the offal to steam and agitator, subjecting it to water and agitator, stopping agitator, drawing off oil, discharging waste water, readmitting steam, and, finally, blowing out the residuum, substantially as specified.

5. In the process of treating offal which has been subjected to the action of steam, wa'er, and an agitator, the drawing off of nutritious matter between the oily and fertilizing matter, substantially as specified.

6. The process of treating offal which consists in placing it in tank A, admitting steam through pipe a, revolving agitator B, shutting off steam, admitting water under pressure through pipe b, stopping agitator, drawing off oil through cock e, drawing off water through pipe d, readmitting steam, and blowing off residuum through pipe g while agitator is revolved, substantially as herein shown and described.

MAX AMS.

Witnesses:
R. H. ROY,
F. V. BRIESEN.